Figure 1:
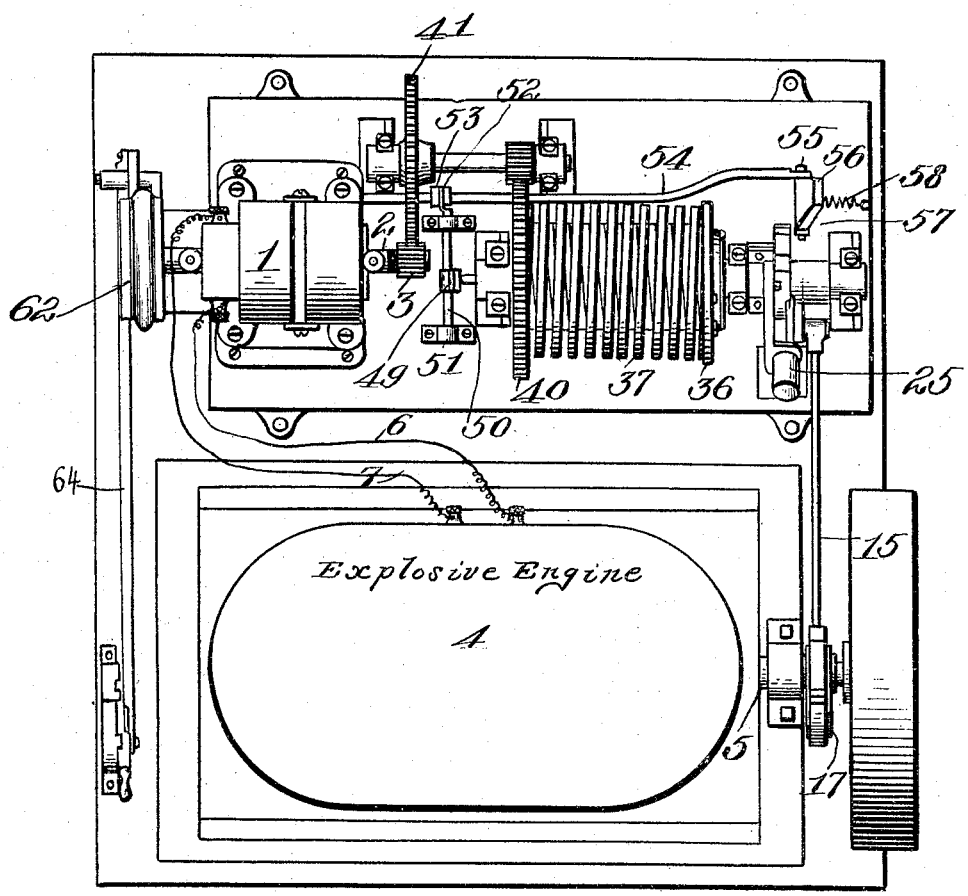

No. 794,011. PATENTED JULY 4, 1905.
W. B. HAYDEN.
ATTACHMENT FOR EXPLOSIVE ENGINES.
APPLICATION FILED OCT. 22, 1904.

2 SHEETS—SHEET 1.

Witnesses:
G. D. Kesler
James L. Norris, Jr.

Inventor
William B. Hayden
By James L. Norris
Atty.

No. 794,011. PATENTED JULY 4, 1905.
W. B. HAYDEN.
ATTACHMENT FOR EXPLOSIVE ENGINES.
APPLICATION FILED OCT. 22, 1904.

2 SHEETS—SHEET 2.

Witnesses:
C. Kesler
James L. Norris, Jr.

Inventor
William B. Hayden
By James L. Norris
Atty.

No. 794,011. Patented July 4, 1905.

UNITED STATES PATENT OFFICE.

WILLIAM B. HAYDEN, OF NEW YORK, N. Y.

ATTACHMENT FOR EXPLOSIVE-ENGINES.

SPECIFICATION forming part of Letters Patent No. 794,011, dated July 4, 1905.

Application filed October 22, 1904. Serial No. 229,603.

*To all whom it may concern:*

Be it known that I, WILLIAM B. HAYDEN, a citizen of the United States, residing at New York, in the county of New York and State of New York, have invented new and useful Improvements in Attachments for Explosive-Engines, of which the following is a specification.

This invention relates to attachments for explosive-engines of the class in which is employed an electrical sparking device for the explosive charge.

Primarily the invention resides in means for governing the speed of an electrical generator for sparking purposes.

The invention further aims to provide new and novel means to prevent the operation of the generator above a certain speed limit.

The invention further resides in providing a rotatable yielding coupling device between the generator and the engine, said coupling so constructed as to transmit movement to the generator from the engine and obtain regularity of speed for the generator-shaft, as well as a steady and continuous rotary motion for the generator-shaft, whether the power-transmitting means for said coupling be a reciprocating or rotary one. Furthermore, to prevent sudden shocks to the generator, as well as enabling the storing up of sufficient energy so that the generator can be operated in advance of the operation of the engine, said coupling further adapted to cause the operation of the generator in one direction whether the engine is reversed or running ahead.

The invention further aims to provide means for operating the rotatable yielding coupling device manually, so that the generator can be operated in advance of the engine to obtain sufficient electrical energy to form a spark, so as to ignite the explosive or combustible charge at the proper moment.

The invention further aims to provide means to retard the speed of the generator when initially starting the same, thereby prolonging the initial operation, but at the same time generating sufficient energy to form a spark to ignite the explosive or combustible charge to start the engine.

The invention further aims to provide means operated by the yielding coupling device for automatically discontinuing its operation by the engine when the speed limit for the generator is exceeded.

The invention further aims to provide means for locking the generator, so as to store up sufficient energy in the coupling device to enable the operation of the generator in advance of the engine, such operation generating sufficient electrical energy to form a spark for igniting the explosive or combustible charge to start the engine.

The invention further aims to provide means for storing up sufficient energy in the coupling device while running to enable the operation of the generator in advance of the engine when starting.

The invention further aims to provide new and novel attachments for obtaining the objects hereinbefore set forth, and which shall be simple in construction, strong, durable, efficient in its use, and comparatively inexpensive to set up.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 2:
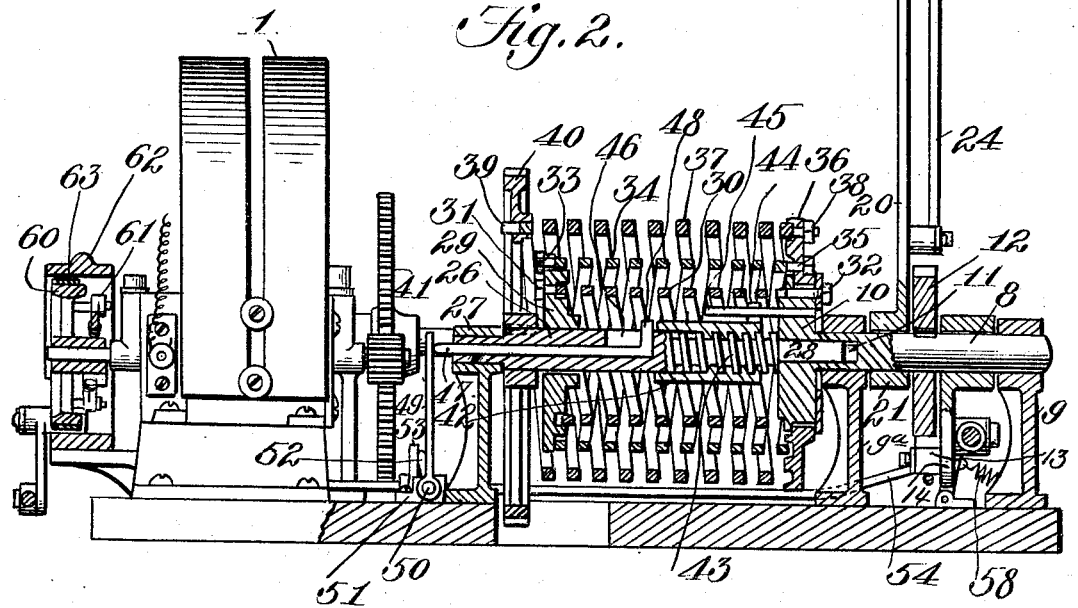
Figure 4:
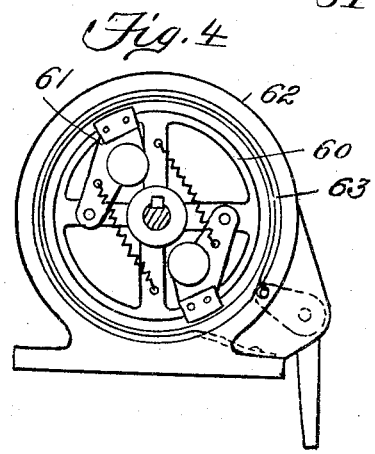
Figure 3:
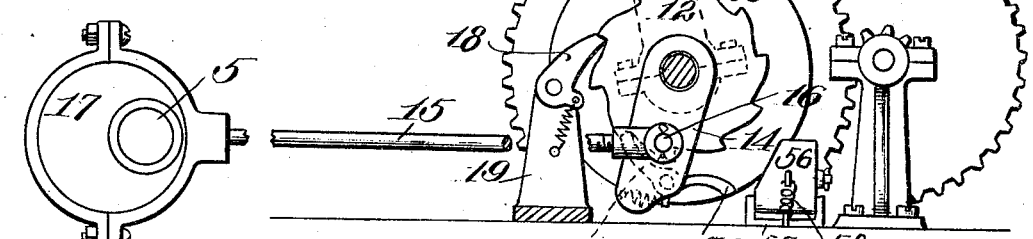

Figure 1 is a top plan view of an explosive-engine with the attachments constructed in accordance with this invention applied thereto. Fig. 2 is a sectional elevation. Fig. 3 is a side elevation, and Fig. 4 is a view showing the speed-governor.

Referring to the drawings by reference characters, 1 denotes an electrical generator; 2, its shaft; 3, a pinion on one end of the generator-shaft, said pinion 3 preferably being constructed of insulating material or insulated from said shaft 2; 4, an explosive-engine; 5, the engine-shaft, and 6 7 sparking-circuit-wire connections between the generator 1 and the combustion-chamber of the engine 4. The foregoing elements may be of any suitable construction.

The reference character 8 denotes a rotatable shaft supported upon a pair of bearing-standards 9 9ª, and said shaft 8 at its inner end terminates in a disk 10, provided with a bearing-socket 11. The disk 10 preferably is formed integral with the inner end of the shaft 8; but, if desired, may be a separate element and fixedly connected in position. The shaft 8 is rotated through the medium of an actuating mechanism driven from the engine, and said mechanism consists of a toothed wheel 12, arranged intermediate the ends of and fixed upon the shaft 8. The toothed wheel 12 is engaged and rotated by an oscillatory spring-pressed pawl 13, carried on the lower end of a hanger 14, loosely suspended from the shaft 8, and when the wheel 12 is rotated by the pawl 13 motion is also imparted to the shaft 8, which is evident owing to the fact that said wheel 12 is fixed to or forms a part of said shaft 8. The pawl 13 receives its oscillations through the operation of the hanger 14, which is driven from the engine through the medium of a reciprocatory rod 15, pivotally connected at one end to a laterally-extending stud 16 on the hanger 14, and at its other end is attached to an eccentric 17, mounted on the engine-shaft 5. Any other suitable connection between the hanger 14 and the engine-shaft 5 than that as shown can be employed; but the structure illustrated is the preferred manner of imparting an oscillatory movement to the pawl 13, so as to impart a rotating movement to the toothed wheel 12 and shaft 8. The shaft 8, disk 10, toothed wheel 12, pawl 13, hanger 14, and connection 15 are termed the "operative" connection between the engine and yielding coupling device to be hereinafter referred to.

To prevent back rotation of the toothed wheel 12, a pawl 18 is provided, said pawl 18 being supported upon the brackets 19, which are arranged at the rear of the wheel 12. The pawl 18 engages with and arrests the rearward movement of the wheel 12 when occasion requires. A manually-operated mechanism for rotating the shaft 8 is also provided, and said manually-operated mechanism is adapted to rotate the wheel 12 and shaft 8 independently of the engine. Said manually-operated mechanism consists of a hand-lever 20, loosely mounted at its lower end upon the shaft 8, as at 21. The hand-lever 20 is arranged at one side of the toothed wheel 12, and the connection between said lever 20 and the shaft 8 is arranged upon the shaft 8 adjacent to the hanger 14. Near the lower end of the hand-lever 20, extending over the toothed wheel 12 and in close proximity to said wheel 12, is a stud 22, and upon which is mounted a spring-actuated dog 23, connected to the lower end of an actuating-rod 24, the latter extending parallel with the hand-lever 20 and also extending through the handle 25 of said hand-lever 20 and terminating in a head, so that by exerting pressure upon the head of the rod 24 the dog 23 can be moved into engagement with the teeth of the wheel 12. By such an arrangement when the hand-lever 20 is oscillated and the dog 23 brought into engagement with the toothed wheel 12 the latter can be rotated and a rotary movement also imparted to the shaft 8. Owing to the fact that the hand-lever is loosely mounted upon the shaft 8 when the latter is rotated by the connections between it and the engine, the hand-lever 20 will not interfere in any manner with the rotation of the shaft 8. As before stated, the hand-lever and its connections provide a means for rotating the toothed wheel 12 and shaft 8 independently of the engine.

The rotatable yielding coupling device which is interposed between the engine and the generator, so as to operate the generator when the engine is operated, as well as operating the generator when the toothed wheel 12 and shaft 8 are rotated by the manually-operated mechanism, consists of a shaft 26, supported at one end upon the bearing-standard 27 and at its other end provided with a bearing-stud 28, which extends into and is rotatable within the bearing-socket 11 in the disk 10. Loosely mounted upon the shaft 26 is an annular member 29, having one end of a coiled tension-spring 30 connected thereto, as at 31. The other end of said spring 30 is connected to the disk 10, as at 32. The coils of the spring 30 are preferably square in cross-section, and the said spring 30 is termed the "inner" spring of the yielding coupling device. The annular member 29 has also connected thereto, as at 33, one end of a coiled tension-spring 34, which surrounds said spring 30 and coils in an opposite direction to that of said spring 30, and said spring 34 is termed the "intermediate" spring of the yielding coupling device, and the coils thereof are substantially square in cross-section. The other end of the spring 34 is connected, as at 35, to a ring 36, loosely mounted upon the disk 10. Surrounding the intermediate spring 34 is a coiled tension-spring 37, which is termed the "outer" spring of the yielding coupling device and which coils in an opposite direction to that of the spring 34, but in the same direction as the spring 30. The coils of the spring 37 are substantially square in cross-section, and one end of said spring 37 is connected, as at 38, to the ring 36, while the other end of said spring 37 is secured, as at 39, to a gear-wheel 40, fixed to the shaft 26. When motion is imparted to the shaft 8 in the manner as hereinbefore described, the disk 10 will be rotated, the latter in turn winding the spring 30 and causing the rotation of the annular member 29. The latter in turn will wind the spring 34 in an opposite direction to that of the spring 30. The winding of the spring 34 will rotate the ring 36, which in turn will wind the spring 37 in an opposite direction to that of the spring 34, and said spring 37 will rotate the gear 40. During the operation of the disk 10, the member 31, and ring 36 the springs 30, 34, and 37 will be wound up, and if the gear 40 is locked in a manner as hereinafter set forth it will be evident that the tension of the said springs will be increased, consequently storing up energy. When the gear 40 is released, the energy which has been stored up in the springs 30, 34, and 37 will cause the rotation of said gear 40. Owing to the employment of a plurality of springs to form the coupling, a compound spring coupling member is set up.

The generator-shaft 2 is operated through the medium of a train of multiplying-gearing 41, which meshes, respectively, with the pinion 3 and the gear 40. The pinion 5, gear 40, and gearing 41 may be of any suitable form or construction, and the gearing 41 may be supported in any suitable manner. The interposition of the multiplying-gear between the generator and the yielding coupling device is for the purpose of obtaining the proper speed of the generator for low-speed or other form of engine, as well as obtaining the necessary speed of the generator for initially starting the same by the manual operation hereinbefore set forth without much effort on the part of the operator when oscillating the hand-lever 20, for the reason that but a few oscillations of the lever 20 are all that is needed to obtain the necessary energy from the springs 30, 34, and 37 when initially starting the generator, so as to generate sufficient electrical energy to form a spark to start the engine.

A power-regulating mechanism is provided to discontinue the operation of the yielding coupling device by the engine when the speed of the generator-shaft exceeds the maximum speed limit—for example, when the speed limit of the generator-shaft is set, say, at two thousand revolutions a minute. If the engine is racing or going at such a rate of speed so as to cause the operation of the generator above two thousand revolutions per minute, the power-regulating mechanism is actuated and discontinues the operation of the yielding coupling device by the engine until the energy stored in said coupling has been spent, so that the operation of the generator-shaft falls below the maximum speed limit or at the maximum speed limit. The power-regulating mechanism is arranged in operative relation with respect to the coupling device as well as being operated by said device and comprises a screw-threaded collar 42, mounted upon the screw-threaded portion 43 of the shaft 26. The collar 42 is provided with an apertured protuberance 44, through which extends an elongated arm 45, fixedly secured to and extending from one face of the disk 10. The opening in the protuberance 44 through which the arm 45 extends is of such diameter as to permit of the protuberance moving longitudinally upon said arm. When the disk 10 is rotated, the collar 42 will be carried therewith. This is evident owing to the employment of the arm 45 in the manner as set forth. The collar 42, owing to the manner in which it is set up, has a longitudinal as well as a rotary movement. The shaft 26 is provided with an axial bore, extending a portion of its length and which terminates at its inner end in an opening 46, and arranged within said axial bore is a shifting rod 47, having its inner end provided with a lug 48, which projects through said opening 46. The lug 48 is arranged in the path of the collar 42. When the collar 42 moves longitudinally in one direction, it will engage the lug 48 and longitudinally shift the rod 47, or, in other words, carry the rod 47 therewith and cause the outer end of said rod 47 to move out of the shaft 26, so as to engage a means for throwing out of operation the pawl 13 with respect to the toothed wheel 12. Said means consists of a vertically-extending arm 49, arranged in the path of the rod 47 and carried by a rock-shaft 50, mounted in the brackets 51. One end of said rock-shaft 50 is provided with an upwardly-extending L-shaped shifting-arm 52, adapted to engage a protuberance 53, carried by an elongated shifting rod 54. The protuberance 53 is arranged in the path of the arm 52, so that when the shaft 50 is rocked said arm 52 will engage the protuberance 53 and impart a longitudinal movement to the rod 54. The outer end of the rod 54 is pivotally connected, as at 55, to a beveled deflecting member 56, hinged to a base-plate 57. The member 56 is retained normally in an upright position through the medium of an extensible spring 58. When the protuberance 53 is engaged by the arm 52 and the rod 54 shifted longitudinally, the deflecting member 56 is moved to an inclined position and in the path of the pawl 13, so that the end 59 of the pawl 13 will engage said deflecting member 56 and which will move the pawl 13 in such a manner that during the oscillations thereof it will not engage with the teeth of the wheel 12, thereby discontinuing the operation of said toothed wheel 12 until the deflecting member 56 resumes its normal or upright position. The spring 58 not only returns the member 56 to its normal position, but causes the rod 54 to assume its normal position, as well as causes the arm 49 to engage the rod 47 and shift it longitudinally in a direction opposite to that to which the rod 47 is shifted by the collar 42. The collar 42 resumes its normal position, or, in other words, discontinues the shifting of the rod 47 when the shaft 26 is rotated—that is to say, the collar 42 moves in an opposite direction to that imparted to it through the medium of the disk 10 when the shaft 26 is rotated.

When the collar 42 moves in an opposite direction to the direction imparted to it by the disk 10, it will be evident that the spring 58 will cause the rod 47 to move toward the collar 42, owing to the engagement of the arm 49 with the rod 47, said arm 49 being caused to move toward the rod 47 by the contraction of the spring 58. The wall of the slot 46 limits the movement in one direction of the rod 47, which is evident. The parts which constitute the power-regulating mechanism are so adjusted with respect to each other that the operation of the member 56 will be so timed that the deflection of the pawl 13 takes place the moment that the speed-governor mechanism (hereinafter referred to) for the generator-shaft comes into play to retard the operation of the generator-shaft when the generator-shaft exceeds the speed limit set therefor. Consequently the tension upon the springs 30, 34, and 37, caused by the coiling of the spring owing to the operation of the toothed wheel 12 by the pawl 13, will be discontinued until a certain amount of the energy stored has been released, and when such release of energy has taken place the member 56 will be moved to its normal or inoperative position, so that the pawl 13 can come into engagement with the toothed wheel 12 and consequently rotate the same, thereby beginning again the coiling action of the springs, and such action will continue until the member 56 has been moved into the path of the pawl 13 to deflect it out of engagement with the toothed wheel 12 during the oscillations of the pawl 13 and until sufficient energy has been released from the springs so as to bring the operation of the generator-shaft within or to the maximum speed limit. The power-regulating mechanism, although operated during the oscillations of the hand-operated mechanism, yet it performs no function in connection with said hand-operated mechanism for initially starting the generator.

To control the speed of the generator-shaft, so as to cause the operation of the power-regulating mechanism when the generator-shaft exceeds the maximum speed set therefor and for also controlling the speed of the generator-shaft when initially starting the governor by the hand-operated mechanism, so as to retard the operation of said shaft should it exceed the speed limit set therefor, thereby prolonging the initial operation of the generator, the generator-shaft near the brake-wheel 60 of the generator is provided with a centrifugal governor 61, which when operated, owing to the generator-shaft exceeding the speed limit set therefor, is adapted to frictionally engage the inner face of a band 62, surrounding the brake-wheel 60, such action retarding the movement of the generator-shaft and when the generator is driven from the engine causes the power-regulating mechanism to come into play and disconnect the coupling device from the engine.

When initially starting the generator, it is necessary to temporarily store up sufficient energy in the coupling device so as to obtain the required speed for the generator-shaft, and for this purpose a band-brake 63 is provided, which is adapted to engage the brake-wheel 60, and thereby lock the generator-shaft, as well as the multiplying-gearing 41 and gear 40, from operation when the hand-operated device is oscillated, which will store up sufficient energy in the coupling device. When a few oscillations have been given to the hand-operated mechanism, the operator releases the band-brake 63, and the energy stored in the springs 30, 34, and 37 will impart the necessary speed to the generator-shaft, thereby generating sufficient electrical energy so as to form a spark to ignite the combustible or explosive charge. In case the speed of the generator-shaft is excessive the frictional centrifugal governor 61 engages the band 62, consequently retarding the movement of the generator-shaft. The band-brake 63 or any other suitable form of brake can be operated by any suitable means, such as a hand-lever 64 or the like, said means for operating the band-brake being arranged in such position as to be convenient to the operator when starting or stopping the generator, so that the generator-shaft can be locked just before the engine stops and energy stored in the compound spring-coupling.

The manner in which the speed of the generator is governed for sparking purposes, the manner in which the spark is formed, the manner in which the generator is operated by hand, the manner in which the generator is driven from the engine, and the manner in which the power transmission is disconnected when the generator-shaft exceeds the speed limit set therefor are as follows: It will be assumed that the engine is to be initially started. The band-brake 63 is operated so as to engage the brake-wheel 60 to prevent operation of the generator-shaft. A few oscillations are then given to the hand-lever 20, which causes the winding up of the compound spring-coupling. The band-brake 62 is then released, and the tension stored in the compound spring-coupling causes the operation of the generator-shaft, generating sufficient electrical energy to form a spark and igniting the explosive mixture in the combustion-chamber of the engine, the engine being set for such purpose. The exploding of the mixture in the combustion-chamber of the engine causes the operation of the engine, which in turn drives the connection 15. The latter imparts oscillations to the pawl 13, which in turn engages the toothed wheel 12, causes the rotation of the shaft 8, and the winding up of the compound spring-coupling. The latter in turn, through the intervention of the gearing 41 and pinion 3, operates the generator-shaft. In case the operation of the generator-shaft is such that it would start to exceed the normal speed limit set therefor the speed-governing mechanism 61 comes into play, and retards the movement of said shaft. Such action throws into operation the power-regulating mechanism—that is to say, causes the pin 47 to travel in a longitudinal direction, engage the arm 49, the latter in turn causing the shaft 50 to rock, carrying the arm 54 therewith and moving the beveled piece 56 in the path of the projection 59 of the pawl 13, shifting the position of said pawl, so that during the oscillations thereof it will not engage the toothed wheel 12, thereby disconnecting the power transmission from said wheel 12 and discontinue the operation of the compound spring-coupling by the engine. During the retarding of the operation of the generator-shaft by the speed-governing mechanism energy will be stored into the coupling, and such energy will cause the generator-shaft to operate when the coupling is disconnected from the engine, and during the operation of the generator-shaft from the energy stored in the compound spring-coupling the power-regulating mechanism will be caused to resume its normal position, which will shift the beveled member 56 out of the path of the projection 59 of the pawl 13, causing said pawl 13 to engage the toothed wheel 12 and connect the compound spring-coupling with the engine, so as to be operated thereby. If occasion requires, upon the stopping of the engine the band-brake 63 may be brought into operation, so as to store up energy into the compound spring-coupling, so as to automatically operate the generator when starting again. All that will be necessary in this case is to release the brake, as the energy stored in the compound spring-coupling will be sufficient to operate the generator, so as to generate sufficient electrical energy to form a spark to start the engine again.

By the employment of the compound yielding coupling device in the manner as set forth it has been found that the said device acts to ward off sudden shocks to the generator and also obtains a steady and continuous motion, as well as an equal regularity in the speed of the generator-shaft. The coupling device, together with the operative connection between it and the engine and between it and the generator, will also cause the operation of the generator in but one direction, whether the engine is reversed or running ahead.

The hand-operated mechanism enables the operation of the compound rotatable yielding spring-coupling device manually, so that the generator can be operated in advance of the engine to obtain sufficient electrical energy to form a spark so as to ignite the explosive or combustible charge in the combustion-chamber of the engine at the proper moment.

It is thought the many advantages of the foregoing invention can be readily understood from the description thereof, taken in connection with the accompanying drawings, and it will furthermore be evident that changes, variations, and modifications can be resorted to without departing from the spirit of the invention or sacrificing any of its advantages, and I therefore do not wish to restrict myself to the details of construction hereinbefore described and as set forth in the annexed drawings, but reserve the right to make such changes, variations, and modifications which are proper for the adaptation of the invention to any usages for which it may be employed, said changes, variations, and modifications to come properly within the scope of the protection prayed.

Having thus fully described my invention, what I claim as new, and desire to secure by Letters Patent, is—

1. The combination of an electrical generator, an engine adapted when operated to operate said generator, a combined energy-storing and compound spring-coupling device interposed between the generator and the engine, said device forming a power-transmitting connection between the engine and the generator so that when the engine is operated, motion will be imparted to the generator and further forming means to operate the generator in advance of its operation by the engine, and a speed and power regulating mechanism operated by said device and adapted to intermittently disconnect said device from the engine and adapted to intermittently discontinue the operation of said device by the engine when the operation of the generator exceeds the speed limit set therefor.

2. The combination of an electrical generator, a gearing for operating it, a compound spring-coupling device for operating said gearing, an engine operatively connected with said device for rotating it, causing thereby the operation of said gearing, and a speed and power regulating mechanism operated by said device and adapted to intermittently discontinue the operation of said device by the engine when the operation of the generator exceeds the speed limit therefor.

3. The combination of an electrical generator, a motor for operating it, a rotatable compound spring-coupling interposed between the generator and the motor and adapted to operate the generator in advance of its operation by the motor, said coupling acting as a power-transmitting connection between the motor and generator so that when the motor is operated, motion will be imparted to the generator, and a speed and power regulating mechanism operated by said coupling and adapted when operated to discontinue the operation of the coupling by the motor.

4. The combination of an electrical generator, a gearing for operating it, a compound spring-coupling connected with the gearing for operating it when said coupling is operated, an engine operatively connected with said coupling for operating it, means engaging with said compound coupling for operating it independently of the engine, causing thereby the operation of said gearing and generator in advance of the operation of the coupling by the engine, and a speed and power regulating mechanism operated by said coupling and adapted when operated to throw out the operative connection between the coupling and the engine.

5. The combination of an electrical generator, an engine, a reciprocatory power-transmitting connection attached to the engine, a rotary yielding coupling device interposed between said generator and said connection and adapted when the engine is operated to cause the operation of said generator, and a speed and power regulating mechanism for said generator operated by said device and adapted to throw out of operation the power-transmitting connection with respect to said device.

6. The combination of an electrical generator, a gearing for operating the generator, an engine, a power-transmitting means attached to the engine, a rotatable yielding coupling device operatively connected with said means and with the gearing and adapted when operated to impart motion to the gearing, and a speed and power regulating means operated by said device and adapted when operated to throw out the operative connection between said power-transmitting means and said device.

7. The combination of an electrical generator, a gearing for operating the generator, an engine, a power-transmitting means attached to the engine, a rotatable yielding coupling device operatively connected with said means and with the gearing and adapted when operated to impart motion to the gearing, a speed and power regulating means operated by said device and adapted when operated to throw out the operative connection between said power-transmitting means and said device, means for manually operating said device to impart movement to the gearing independently of the engine and in advance of the operation of said means by the engine, and means for retarding the operation of the generator when said device is operated to prolong the initial sparking when starting the engine.

8. The combination with an electrical generator and an engine, of a rotatable element driven from said engine and provided with a socket, a shaft having a bearing-stud extending in said socket, a gear carried by said shaft and adapted to gear with the generator for operating it, an annular member loosely mounted upon said shaft, a ring loosely mounted upon said rotatable element, and a plurality of superposed springs connected with said element, member, ring and gear and adapted when said element is driven, to rotate the gear, causing thereby the operation of the generator.

9. The combination with an electrical generator and an engine, of a yielding coupling device between the engine and the generator for operating the latter when the engine is operated, means for storing energy in the coupling device when the engine is stopped so as to operate the generator in advance of the operation of the engine, and a speed and power regulating mechanism operated by said device for intermittently discontinuing the operation thereof by the engine when the generator is operating above the speed limit set therefor.

10. The combination with an electrical generator and an engine, of a multiplying gearing for operating said generator, a yielding coupling device between said engine and said gearing for operating the latter when the engine is operated, means for storing energy in said coupling device when the engine is stopped to permit of operating the generator in advance of the engine, and a speed and power regulating mechanism operated by said device for intermittently discontinuing the operation thereof by the engine when the generator is operating above the speed limit set therefor.

11. The combination with an electrical generator and an engine, of a multiplying gearing for operating said generator, a yielding coupling device between said engine and said gearing for operating the latter when the engine is operated, manually-operated means for storing energy in said coupling device when the engine is stopped to permit of operating the generator in advance of the engine, and a speed and power regulating mechanism operated by said device for intermittently discontinuing the operation thereof by the engine when the generator is operating above the speed limit set therefor.

12. The combination with an electrical generator and an engine, of a gearing for operating said generator, a yielding coupling device between said engine and said gearing for operating the latter when the engine is operated, means for storing energy in said coupling device when the engine is stopped to permit of operating the generator in advance of the engine, a manually-operated means for operating said coupling device, causing thereby the operation of the generator in advance of the engine, and means operated by said coupling device for intermittently disconnecting said coupling device from the engine when the engine is running at a speed which would be injurious to the generator.

13. The combination with an electrical generator and an engine, a rotatable shaft, a toothed wheel carried by the shaft, an operative connection between said wheel and said engine for imparting motion to the shaft, a train of gearing for operating the generator, a yielding connection between the shaft and gearing, causing thereby the operation of the latter, and means operated by said yielding connection for automatically throwing out of operative relation said operative connection between the wheel and engine, causing thereby the discontinuing of the operation of said shaft.

14. An attachment for explosive-engines involving the combination with a generator, of means suitably connected therewith for operating it, said means consisting of a compound spring-coupling device consisting of a rotatable shaft, a rotatable member, a rotatable disk, a ring loosely mounted upon said disk, an inner coiled spring connected at one end to said member and said disk, an intermediate coiled spring connected at one end to said member and said ring, and an outer coiled spring connected at one end to said ring and at its other end with said shaft, combined with means for rotating said device, and means to prevent back rotation of said device.

15. The combination with an electrical generator, an engine, and a spring-coupling device gearing with the generator and suitably connected with the engine and adapted when the engine is operated to have movement imparted thereto, causing thereby the operation of the generator, of a speed and power regulating mechanism for throwing out the connection between the engine and said device, said mechanism consisting of a rotatable sleeve, a longitudinally-shiftable rod adapted to be engaged by said sleeve, a vertically-extending arm adapted to be shifted by said rod, a rock-shaft carrying said arm, a longitudinally-shiftable rod actuated by said rock-shaft, a beveled deflecting member hinged at its lower end and pivotally connected to said last-mentioned rod, and means for automatically returning said deflecting member to its normal position.

16. The combination with an electrical generator and an engine, of a rotatable element, a toothed wheel fixed thereto, a pawl driven from the engine and adapted to engage with said wheel, thereby imparting movement to said element, said rotatable element provided with a socket at one end, a shaft having a bearing-stud extending in said socket, a gear fixedly connected with said shaft, an annular member loosely mounted upon said shaft, a ring mounted upon said rotatable element, a spring connected at one end with said rotatable element and at its other end with said member, a spring connected at one end with said member and at its other end with said ring, a spring connected at one end to said ring and at its other end with said gear, a screw-threaded collar mounted upon said shaft and adapted to be longitudinally moved when said element is rotated, a rod carried by said shaft and adapted to be longitudinally shifted by said collar, a rock-shaft carrying an arm adapted to be engaged by said rod, thereby rocking said shaft, a longitudinally-shiftable member adapted to be engaged by said rock-shaft, causing thereby the shifting of said member in one direction, a beveled deflecting member carried on one end of said longitudinally-shiftable member and adapted when moved from normal position, to cause the disengagement of said pawl with said wheel, means for returning said longitudinally-shiftable member, deflecting member, rock-shaft and rod to their normal positions, and means interposed between the gear and the generator for operating the latter when said element is rotated.

17. The combination with an electrical generator, an engine, and a compound spring-coupling device gearing with the generator and suitably connected with the engine and adapted when the engine is operated to have movement imparted thereto, causing thereby the operation of the generator, of means for disconnecting said coupling device from the engine when the engine is operating at a speed that would be injurious to the generator, said means consisting of a rotatably and longitudinally movable collar, a longitudinally-shiftable member engaged and shifted in one direction by said collar, a rock-shaft having a vertically-extending arm adapted to be engaged by said member, causing thereby the rocking of said shaft, a longitudinally-shiftable rod engaged by and shifted by said shaft, and a deflecting member suitably connected with one end of said rod.

18. The combination with an electrical generator and an engine, of a compound spring-coupling device gearing with the generator and suitably connected with the engine and adapted when the engine is operated to have movement imparted thereto, causing thereby the operation of the generator, and a speed and power regulating mechanism operated by said device and adapted to intermittently discontinue the operation of said device when the engine is operating at a speed which would be injurious to the generator.

19. In combination, an electrical generator, an explosive-engine, a power-transmitting device interposed between the generator and the engine, and means operated by said device for intermittently discontinuing the operation of the said device when the operation of the generator exceeds the maximum speed limit set therefor.

20. In attachments for explosive-engines, a driving element, a driven element a power-transmitting means interposed between the said elements, and means operated by said power-transmitting means for intermittently discontinuing the operation thereof by the driving element when the operation of the driven element exceeds the maximum speed limit set therefor.

21. In combination, an electrical generator, an engine, a rotatable yielding coupling device gearing with the generator and adapted to operate it, an oscillatory hanger suspended from said coupling device, a toothed wheel fixed to said coupling device, a pawl carried by said hanger and adapted to engage with said toothed wheel for rotating it, causing thereby the rotation of said device, a reciprocatory connection between said hanger and the engine for imparting oscillation to the hanger when the engine is operated, and means for automatically throwing said pawl out of engagement with said wheel when further torsion would be injurious to the spring.

22. In combination, an electrical generator, an explosive-engine, a torsional power-transmitting device interposed between the generator and the engine, and means for automatically discontinuing the torsion of said device when further torsion would be injurious thereto.

23. In combination, an electrical generator, an explosive-engine, a torsional power-transmitting device interposed between the generator and the engine, and means operated by said device for automatically discontinuing the torsion of said device, when further torsion would be injurious thereto.

24. In combination, an electrical generator, an explosive-engine, a power-transmitting device interposed between the generator and the engine, and means intermittently operated by said device for regulating the speed of the generator by said device when the speed of the generator exceeds the maximum limit set therefor.

25. In attachments for explosive-engines, a driving element, a driven element, a power-transmitting device interposed between the said elements, and an intermittently-operated means regulating the speed of the driven element by said device when the speed of said driven element exceeds the maximum limit set therefor.

26. In attachments for explosive-engines, a driving element, a driven element, a power-transmitting device for operating said driven element up to a certain speed limit, and means intermittently operated by said device for regulating the speed of the driven element by said device when the speed of the driven element exceeds the maximum speed limit set therefor.

In testimony whereof I have hereunto set my hand in presence of two subscribing witnesses.

WILLIAM B. HAYDEN.

Witnesses:
    CHARLES H. HAYDEN,
    COTTON ALLEN HAYDEN.